United States Patent
Snytsar

(10) Patent No.: US 12,182,554 B2
(45) Date of Patent: Dec. 31, 2024

(54) INTERLEAVED MACHINE INSTRUCTION PLACEMENT IN MEMORY

(71) Applicant: Microsoft Technology Licensing, LLC, Redmond, WA (US)

(72) Inventor: Roman Snytsar, Sammamish, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 120 days.

(21) Appl. No.: 17/930,795

(22) Filed: Sep. 9, 2022

(65) Prior Publication Data

US 2024/0086162 A1    Mar. 14, 2024

(51) Int. Cl.
*G06F 8/41*    (2018.01)

(52) U.S. Cl.
CPC ............ *G06F 8/447* (2013.01); *G06F 8/4452* (2013.01); *G06F 8/452* (2013.01)

(58) Field of Classification Search
CPC ......... G06F 8/447; G06F 8/4452; G06F 8/452
See application file for complete search history.

(56) References Cited

U.S. PATENT DOCUMENTS

| | | | | |
|---|---|---|---|---|
| 5,230,053 A * | 7/1993 | Zaiki | ....................... | G06F 8/452 717/161 |
| 5,958,048 A * | 9/1999 | Babaian | .............. | G06F 9/30072 713/502 |
| 6,192,515 B1 * | 2/2001 | Doshi | ................... | G06F 8/4452 712/241 |
| 6,507,947 B1 * | 1/2003 | Schreiber | ................. | G06F 30/30 717/160 |
| 6,820,250 B2 * | 11/2004 | Muthukumar | ........ | G06F 8/4452 717/150 |
| 6,826,677 B2 * | 11/2004 | Topham | ................... | G06F 8/441 712/216 |
| 10,115,175 B2 * | 10/2018 | Gruber | ................... | G06F 9/3851 |
| 10,241,970 B2 | 3/2019 | Lo et al. | | |
| 2001/0016901 A1 * | 8/2001 | Topham | ................ | G06F 9/3836 712/217 |
| 2004/0015934 A1 * | 1/2004 | Muthukumar | ........ | G06F 8/4452 717/160 |

(Continued)

OTHER PUBLICATIONS

International Search Report and Written Opinion received for PCT Application No. PCT/US23/030124, mailed on Nov. 21, 2023, 16 pages.

(Continued)

*Primary Examiner* — Matthew J Brophy
(74) *Attorney, Agent, or Firm* — Barta Jones, PLLC

(57) ABSTRACT

Solutions for improving parallelization of computer programs interleave machine instruction placement in memory. A compiler decomposes a software loop in stages to interleave instructions such that, for contiguous sets of instructions having some minimum length (e.g., each set has at least two to four instructions), instructions within a set have no dependency on prior instructions within that set. This enables the compiled program to be more fully parallelized—for example, either by a superscalar processor executing the compiled program, or by the compiler turning each set of instructions into a very long instruction word (VLIW)—to automatically benefit from the disclosed interleaving of instructions that eliminates dependencies.

20 Claims, 8 Drawing Sheets

(56) References Cited

U.S. PATENT DOCUMENTS

| | | | | |
|---|---|---|---|---|
| 2005/0097509 A1* | 5/2005 | Rong | .................... | G06F 8/4452 |
| | | | | 717/106 |
| 2005/0114850 A1* | 5/2005 | Chheda | ............... | G06F 9/30083 |
| | | | | 717/151 |
| 2005/0138613 A1* | 6/2005 | Archambault | ........ | G06F 8/4442 |
| | | | | 717/160 |
| 2013/0080737 A1* | 3/2013 | Reid | .................... | G06F 9/3838 |
| | | | | 712/201 |
| 2013/0111453 A1* | 5/2013 | Kalogeropulos | ..... | G06F 8/4452 |
| | | | | 717/161 |
| 2015/0106603 A1* | 4/2015 | Ahn | ..................... | G06F 8/4452 |
| | | | | 712/241 |
| 2018/0181398 A1* | 6/2018 | Scherbinin | ............ | G06F 9/3017 |
| 2018/0181400 A1* | 6/2018 | Scherbinin | .............. | G06F 8/452 |

OTHER PUBLICATIONS

Lam, et al., "Software pipelining: an effective scheduling technique for VLIW machines", ACM Digital Library, Jun. 1, 1988, pp. 318-328.

Lu, et al., "An extended scheduling technique for software pipelining", Elsevier Science Publishers, vol. 37, Issue 1-5, Jan. 1, 1993, pp. 99-103.

Weiss, et al., "A study of scalar compilation techniques for pipelined supercomputers", ACM Digital Library, Oct. 1, 1987, pp. 105-109.

\* cited by examiner

INTERLEAVED MACHINE INSTRUCTION PLACEMENT IN MEMORY

BACKGROUND

Modern processors, such as central processing units (CPUs) are able to speed up execution of computer programs by executing in parallel, under certain circumstances. Some processors are able to execute parallelized instructions, such as very long instruction word (VLIW) instructions that contain multiple instructions that would otherwise be executed sequentially on a traditional processor. However, programming with VLIW instructions adds complexity and challenges.

Some processors are able to convert serial programs to parallel execution by leveraging a superscalar architecture. Superscalar processors look ahead of the current instruction pointer (up to some limit) for instructions that can be executed in parallel (e.g., out of order) and, if any are found, parallel execution is implemented. This frees up human programmers from having to write programs with parallelism. However, two instructions cannot be executed in parallel if one instruction has dependency (e.g., data dependency) on the other, such as one instruction that uses the result of the immediately prior instruction. Because computer programs often have sets of instructions with strings of dependencies, the benefits of a superscalar architecture are reduced.

Reduced use of parallelization consumes additional processing resources and results in longer runtimes for many computer programs.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for interleaving machine instruction placement in memory include: receiving, by a compiler, a program having a loop, the loop having a first loop iteration and a final loop iteration, the loop containing a first set of instructions indexed on a current loop iteration and at least one instruction of the first set of instructions does not have dependency on any prior instruction within the loop, and the loop further containing a second set of instructions indexed on the current loop iteration, at least a portion of the second set of instructions having dependency on the first set of instructions indexed on the same loop iteration; moving, to ahead of the loop in execution order, an instruction of the first set of instructions indexed on the first loop iteration; moving, to following the loop in execution order, an instruction of the second set of instructions indexed on the final loop iteration; and interleaving, within a machine memory, remaining first set of instructions with remaining second set of instructions, such that, within the loop, an instruction of the first set of instructions indexed on the current loop iteration precedes an instruction of the second set of instructions indexed on a preceding loop iteration.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
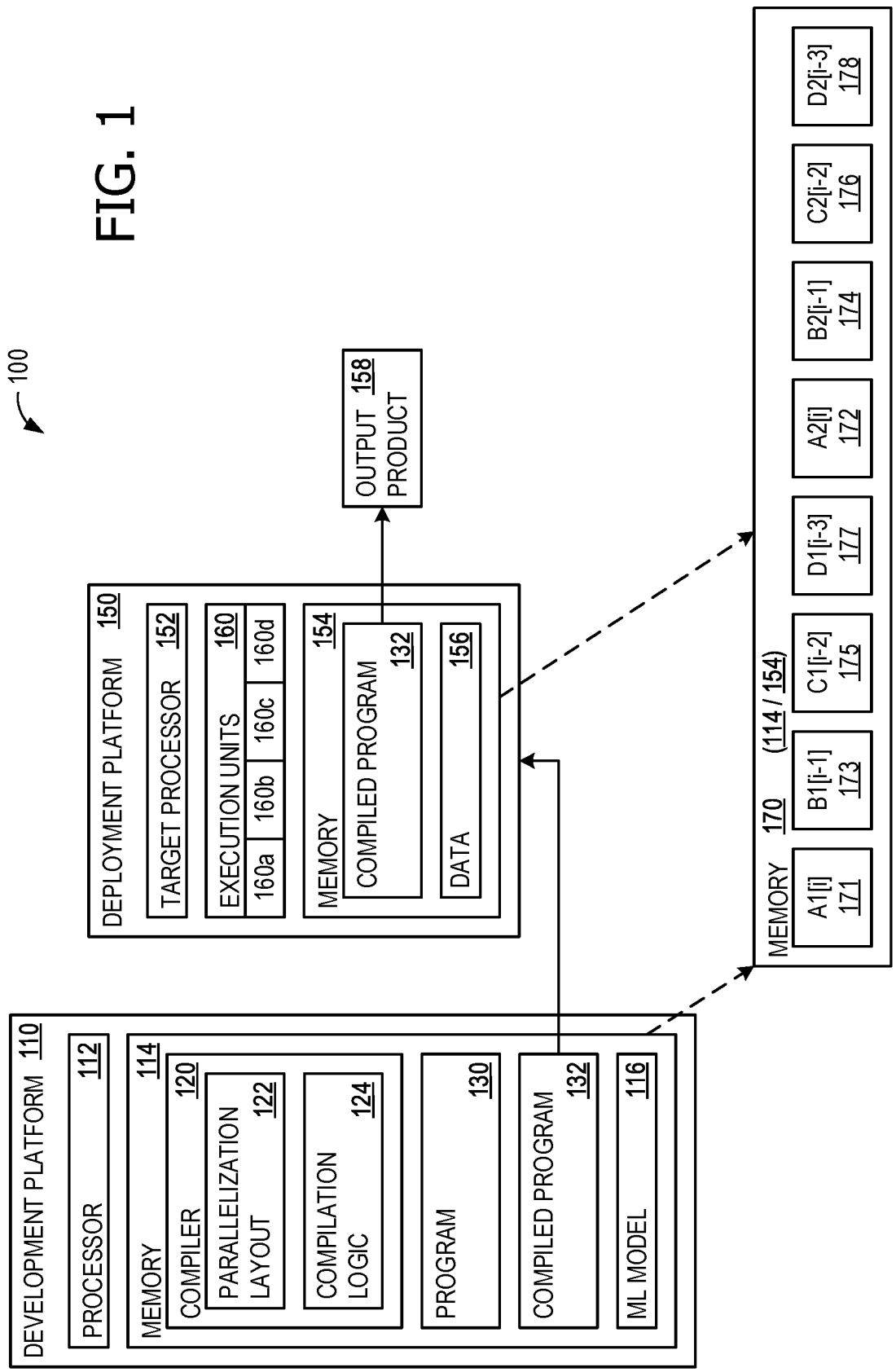
FIG. 1 illustrates an example architecture that advantageously provides for interleaving machine instruction placement in memory.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Solutions for improving parallelization of computer programs interleave machine instruction placement in memory. A compiler decomposes a software loop in stages to interleave instructions such that, for contiguous sets of instructions having some minimum length (e.g., each set has at least two to four instructions), instructions within a set have no dependency on prior instructions within that set. This enables the compiled program to be more fully parallelized—for example, either by a superscalar processor executing the compiled program, or by the compiler turning each set of instructions into a very long instruction word (VLIW). Although writing software in high-level languages typically results in a large number of instructions having dependency on an immediately-prior instruction, especially in "for-loops" or "do loops" optimized according to traditional programming techniques, either final parallelization solution described herein is able to benefit from the disclosed interleaving of instructions that eliminates dependencies.

Aspects of the disclosure improve the operation of computing devices, for example, enabling a processor to execute multiple instructions per clock cycle, thereby reducing electricity consumption (e.g., the processor uses fewer clock cycles to execute a given computer program). This is accomplished, at least in part, by interleaving, within a machine memory, a first set of instructions with a second set of instructions, such that, within a loop, an instruction of the first set of instructions indexed on a current loop iteration precedes an instruction of the second set of instructions indexed on a preceding loop iteration. Prior to the interleaving, the first and second sets of instructions are adjusted in execution order to eliminate dependencies. The elimination of dependencies permits parallelization of the first and second sets of instructions, either by a compiler generating VLIW instructions, or by a superscalar CPU (that would otherwise be thwarted in parallelization efforts by instruction dependencies).

Examples may be deployed in compilers used for a wide range of programs, such as machine learning (ML) (including artificial intelligence (AI) and neural networks (NNs)), and any type of scientific or mathematically intense programs that use common for-loops (also known as do-loops). Examples may also lessen the need for hyper-threading. Hyper-threading is a process by which a CPU divides its physical cores into virtual cores (called "threads") that are treated as if they are actually physical cores by the operating system.

FIG. 1 illustrates an example architecture 100 that advantageously provides for interleaving machine instruction placement in memory. In architecture 100, instructions 171-178 (machine instructions) are interleaved in memory 107 (machine memory) such that instructions 171, 173, 175, and 177 do not have any dependence (e.g., data dependence) on each other, and instructions 172, 174, 176, and 178 do not have any dependence on each other. This permits parallel execution of instructions 171, 173, 175, and 177, such that all of instruction 171, instruction 173, instruction 175, and instruction 177 execute simultaneously in a target processor 152, and also permits parallel execution of instructions 172, 174, 176, and 178, such that all of instruction 172, instruction 174, instruction 176, and instruction 178 execute simultaneously in target processor 152.

If each of instructions 171-178 takes only a single clock cycle, target processor 152 will be able to achieve four instructions per clock cycle (IPC) to compete all eight instructions in two clock cycles. This is in stark contrast to serial execution which would require eight clock cycles. The runtime improvement for this illustrated example is a factor of four, which is a result of interleaving machine instruction placement in memory 170, as described below. Further detail regarding why instructions 171, 173, 175, and 177 have different indexing (e.g., "[i], [i−1], . . . ") is described in relation to FIGS. 3A-3D.

Architecture 100 includes a development platform 110, on which a program 130 is written and compiled into a compiled program 132, and a deployment platform 150, on which compiled program 132 is executed to generate an output product 158, using data 156.

Development platform 110 has a processor 112 and a memory 114, which holds a compiler 120 and program 130. Compiler 120 has compilation logic which renders program 130 into compiled program 132, and a parallelization layout 122 that provides the advantageous interleaving and other actions to render compiled program 132 into a layout that makes more complete use of the parallelization capabilities of target processor 152. In some examples, development platform 110 is an example of computing device 800 of FIG. 8, processor 112 is an example of processor 812, and memory 114 is an example of memory 812. In some examples, program 130 is written by a human in assembly language or a high-level language such as C. In some examples, compiled program 132 is in machine language specific to target processor 152.

An ML model 116 monitors the performance of parallelization layout 122 in re-arranging the instructions of compiled program 132 and adjusts parameters for performance, such as how sets of instructions are identified and balanced. Identifying sets of instructions and balancing sets of instructions are described below, for example in relation to FIGS. 3 and 5. Feedback for ML model 116 may include the number of different sets of instructions relative to the parallel processing capacity of target processor 152, imbalances in the number of instructions of the different sets of instructions, and runtime improvements.

Deployment platform 150 has target processor 152 and a memory 154, which holds compiled program 132 and data 156. Compiled program 132 executes on target processor 152 and uses data 156 to generate output product 158. In some examples, deployment platform 150 is an example of computing device 800 of FIG. 8, target processor 152 is an example of processor 812, and memory 154 is an example of memory 812. In some examples, deployment platform 150 and development platform 110 are the same machine (e.g., same computing device). Memory 170 represents memory 114 and/or memory 154, whichever is holding compiled program 132.

In the illustrated example, target processor 152 has a set of execution units 160 that includes at least four units: a unit 160a, a unit 160b, a unit 160c, and a unit 160d. This permits target processor 152 to execute four instructions in parallel (e.g., simultaneously). The execution units may be arithmetic logic unit (ALUs). In some examples, two units can perform arithmetics, one performs data load, and one performs a data write. For simplicity of explanation, the examples provided herein for parallel instructions are all arithmetic.

Figure 2A:
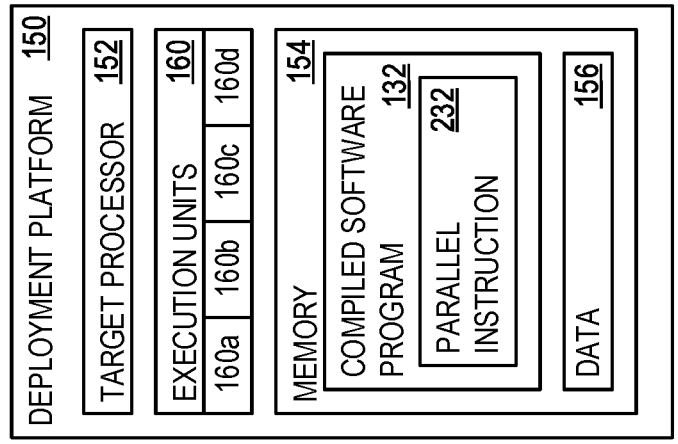
FIGS. 2A and 2B illustrate parallelization solutions available with various architectures, such as the example architecture of FIG. 1.

FIG. 2A illustrates a parallelization solution available with architecture 100. In FIG. 2A, target processor 152 is a parallelizing processor, such as a superscalar processor that has parallelizing logic 252, such as superscalar functionality that looks for instruction-level parallelism opportunities. Parallelizing logic 252 dynamically checks for data dependencies between instructions at run time (versus at compile time). During execution, compiled program 132 is converted (in segments, within target processor 152) into parallelized compiled program 132a, although parallelized compiled program 132a may be held only in cache memory and not persisted. The scenario illustrated in FIG. 2A is supported by a wide range of currently-available CPUs.

Figure 2B:
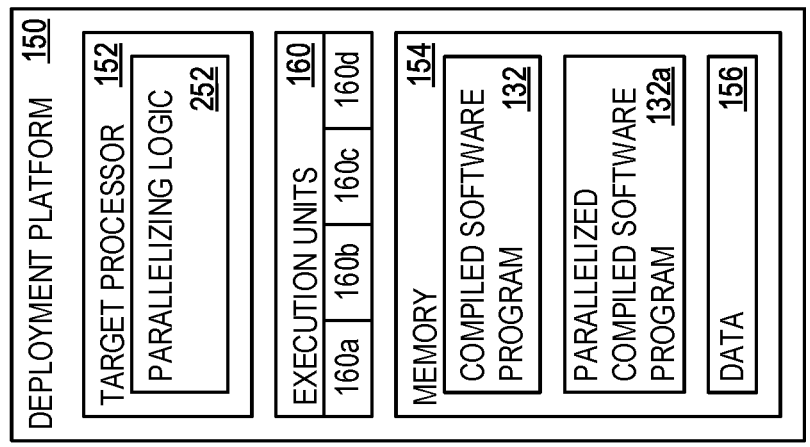

FIG. 2B illustrates another parallelization solution available with architecture 100. In FIG. 2B, target processor 152 is capable of executing parallel instructions, such as VLIW instructions. As such, compiled program 132 is compiled with one or more parallel instructions 232 (e.g., VLIW instructions).

Figure 3A:
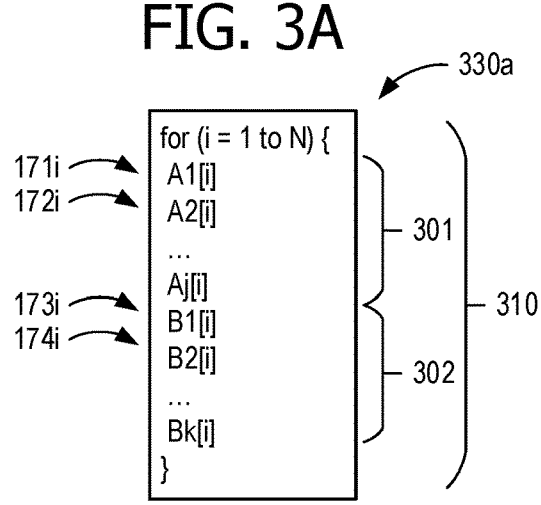
FIGS. 3A, 3B, 3C and 3D illustrate stages of interleaving machine instruction placement in memory with various architectures, such as the example architecture of FIG. 1.

FIGS. 3A, 3B, 3C and 3D illustrate stages of interleaving machine instruction placement in memory with architecture 100. FIG. 3A shows a stage of converting compiled program 132 for better parallelization as an intermediate stage program 330a, with a loop 310 using an index variable i. The first loop iteration occurs when i=1, which is 1-based indexing for the purposes of simple illustration, although computer programs are typically written with 0-based indexing. The final loop iteration occurs when i=N, which would instead be with i=(N−1) with 0-based indexing.

A first set of instructions 301 is indexed on the loop iteration (e.g., indexed on i), and includes an instruction 171i (A1[i]) and an instruction 172i (A2[i]). First set of instructions 301 is identifiable by a trait that at least one instruction of first set of instructions 301 has dependency on any prior instruction within loop 310. For example, instruction 171i is A1[i]=i+3, and instruction 172i is A2[i]=i+7. Both instruction 171i and instruction 172i may be executed knowing only the value of i, and not needing the result of another instruction. In some examples, instruction 172*i* may have dependency on instruction 171*i*, although in some examples, no instruction of first set of instructions 301 has dependency on any prior instruction within loop 310.

A second set of instructions 302 is indexed on the loop iteration (e.g., indexed on i), and includes an instruction 173*i* (B1[i]) and an instruction 174*i* (B2[i]). Second set of instructions 301 is identifiable by a trait that each instruction of second set of instructions 301 has dependency on an instruction of first set of instructions 301 indexed on the same loop iteration (e.g., the same value of i). For example, instruction 173*i* is B1[i]=A1[i]+1, and instruction 174*i* is B2[i]=A2[i]+1. Instruction 173*i* may be executed only after knowing only the execution result of instruction 171*i*, and instruction 174*i* may be executed only after knowing only the execution result of instruction 172*i*. Within the current loop iteration, second set of instructions 302 is working on prior data items (e.g., (i-1) data items).

Because of these dependencies, instructions 171*i* and 173*i* may not be executed in parallel, and instructions 172*i* and 174*i* may similarly not be executed in parallel. Because a human may write these instructions this way, a superscalar (parallelizing) processor will be unable to take full advantage of its parallelization capabilities. First set of instructions 301 extends out to Aj[i] with j>2, and second set of instructions 302 extends out to Bk[i] with k>2. This is to show the general case in which first set of instructions 301 and second set of instructions 302 have different numbers (counts) of instructions.

Figure 3B:
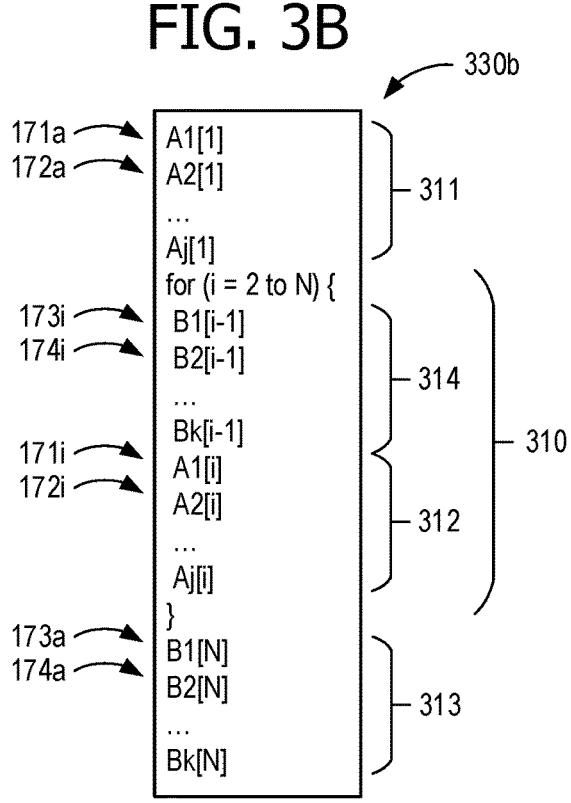

FIG. 3B shows another stage of converting compiled program 132 for better parallelization as an intermediate stage program 330*b*. A first set of instructions indexed on the first loop iteration 311 is the subset of first set of instructions 301 for i=1. This includes an instruction 171*a* (A1 [1]) and an instruction 172*a* (A2[1]). Remaining first set of instructions 312 is first set of instructions 301 after first set of instructions indexed on the first loop iteration 311 is extracted by moving first set of instructions indexed on the first loop iteration 311 ahead of loop 310 in the execution order. Remaining first set of instructions 312 are within loop 310, which now goes from i=2 to N, rather than starting from i=1. The first loop iteration (i-1) is eliminated. What had been the first set of instructions 301 for i=1 is moved to be a prologue to loop 310.

A second set of instructions indexed on the final loop iteration is the subset of second set of instructions 302 for i=N. This includes an instruction 173*a* (B1[N]) and an instruction 174*a* (B2[N]). Remaining second set of instructions 314 is second set of instructions 302 after second set of instructions indexed on the final loop iteration 313 is extracted by moving second set of instructions indexed on the final loop iteration 313 to following loop 310 in the execution order. Remaining second set of instructions 314 are within loop 310. However, since i starts at 2, rather than 1, for B1[1] and B2[1] to execute, instructions 173*i* and 174*i* are changed to be indexed on (i-1), rather than on i, directly.

Figure 3C:
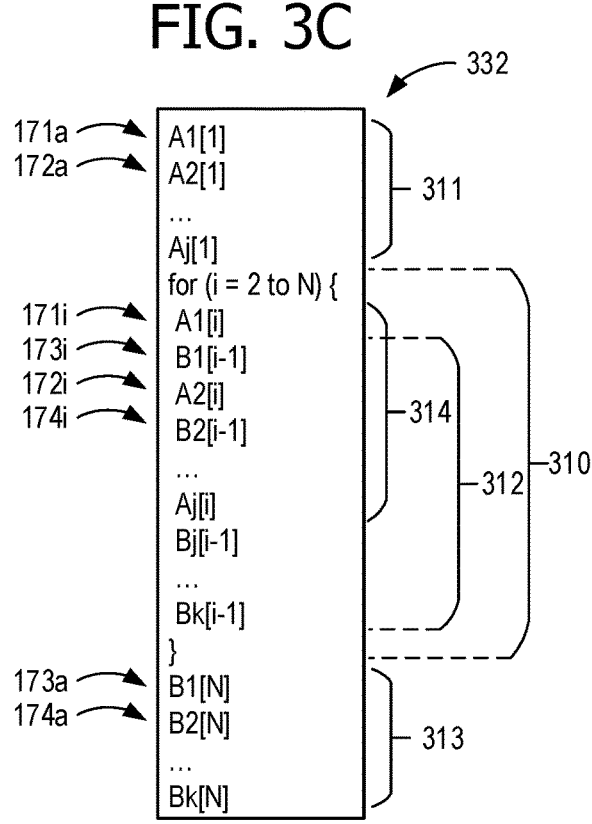

FIG. 3C shows a stage of converting program 130 for better parallelization as an intermediate stage program 332. In some examples, intermediate stage program 332 is already in machine language. Compiled program 132 may be generated from the instruction layout of intermediate stage program 332 (or may be intermediate stage program 332). Instructions 171*i*-174*i* of remaining second set of instructions 312 and remaining second set of instructions 314 are interleaved. Instruction 171*i* precedes instruction 173*i*, but since instruction 173*i* is now indexed on (i-1), it does not have dependency on instruction 171*i*. This permits instructions 171*i* and 173*i* in the current loop iteration to be executed in parallel. This is possible because the prior instruction 171*i* (e.g., instruction 171*i* for the value of i prior to the value of i in the current loop iteration) was already executed in the prior loop iteration, or as instruction 171*a*.

Similarly, instruction 172*i* precedes instruction 174*i*, but since instruction 174*i* is now indexed on (i-1), it does not have dependency on instruction 172*i*. This permits instructions 172*i* and 174*i* in the current loop iteration to be executed in parallel. This is possible because the prior instruction 172*i* (e.g., instruction 172*i* for the value of i prior to the value of i in the current loop iteration) was already executed in the prior loop iteration, or as instruction 172*a*. In the illustrated example, k>j, so there is a larger number of instructions in second set of instructions 302 than in first set of instructions 301. Thus, in this example, some instructions of second set of instructions 302 will be executed serially. In some examples, there is a larger number of instructions in first set of instructions 301 than in second set of instructions 302, and so some instructions of first set of instructions 301 will be executed serially.

Figure 3D:
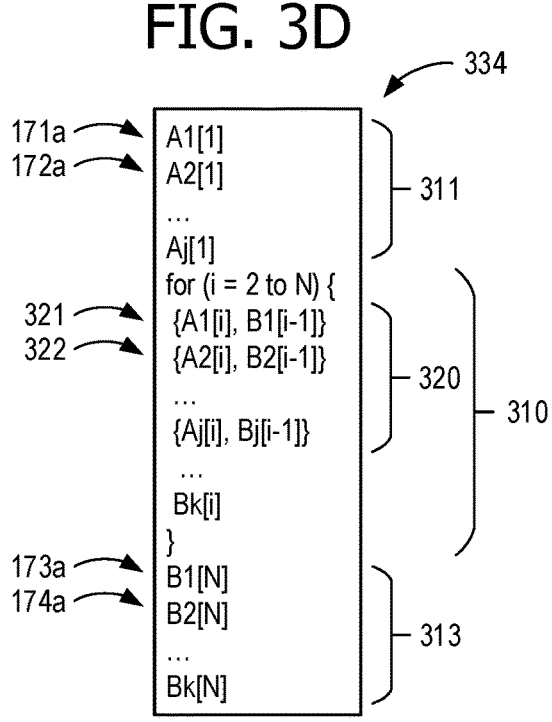

FIG. 3D shows an intermediate stage program 334, which is intermediate stage program 332 using a set of VLIW instructions 320. Specifically, instructions 171*i* and 173*i* are put into a single VLIW instruction 321 and instructions 173*i* and 174*i* are put into a single VLIW instruction 322.

Figure 4A:
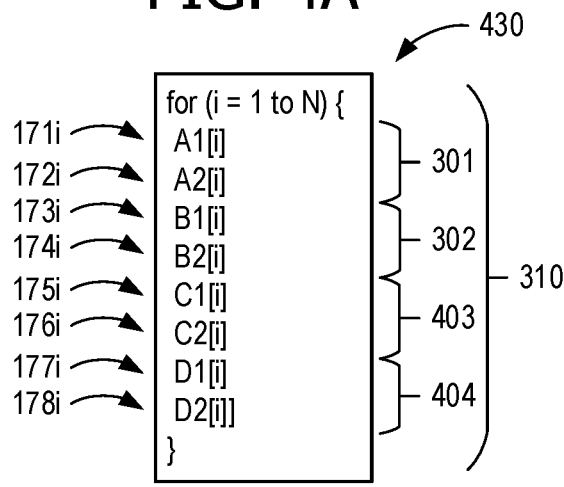
FIGS. 4A and 4B illustrate interleaving four sets of instructions with various architectures, such as the example architecture of FIG. 1.

FIG. 4A illustrates interleaving four sets of instructions with architecture 100. An intermediate stage program 430, which may be in machine language, is to be converted into compiled program 132. Because target processor (see FIG. 1) has the capacity to execute four instructions in parallel, a plurality of sets of instructions is identified within loop 310. First set of instructions 301 comprises instruction 171*i* (A1 [i]) and instruction 172*i* (A2[i]). Second set of instructions 302 comprises instruction 173*i* (B1[i]) and instruction 174*i* (B2[i]). A third set of instructions 403 comprises instruction 175*i* (C1[i]) and instruction 176*i* (C2[i]). A fourth set of instructions 404 comprises instruction 177*i* (D1[N]) and instruction 178*i* (D2[i]).

In this example, at least one instruction of first set of instructions 301 has no dependency on any prior instructions within loop 310. Second set of instructions 302 has dependency on first set of instructions 301. Third set of instructions 303 has dependency on second set of instructions 302. Fourth set of instructions 304 has dependency on third set of instructions 303. For example, For example, instruction 175*i* is C1[i]=B1[i]+1, instruction 176*i* is C2[i]=B2[i]-1, instruction 177*i* is D1 [i]=C1 [i]+A1 [i], and instruction 178*i* is D2 [i]=C2 [i]-A1 [i].

Figure 4B:
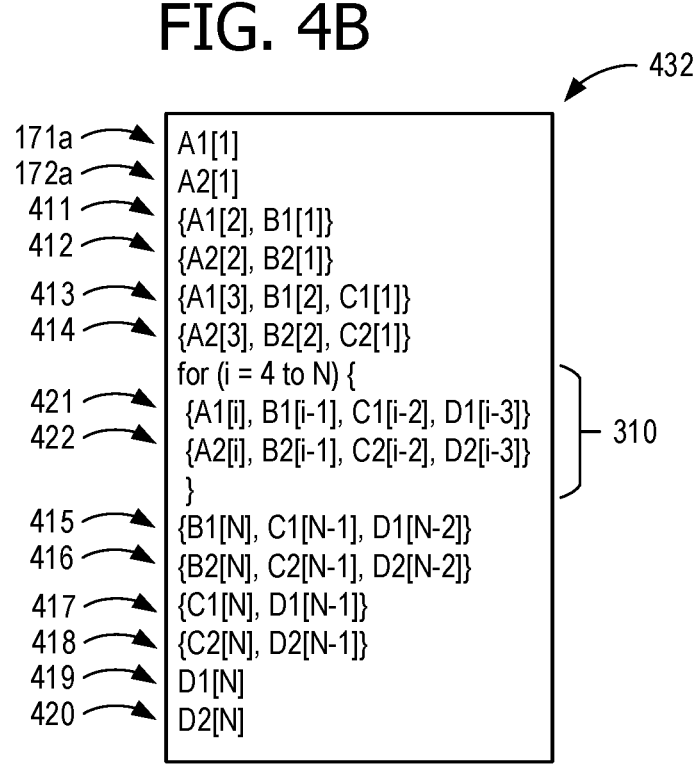

FIG. 4B illustrates an intermediate stage program 432. Because four instructions will be executed in parallel within loop 310, the first three instructions of first set of instructions 301 are executed prior to the start of loop 310. Loop 310 now starts with i=4. This is the general scheme. For M identified sets of instructions that may be executed in parallel, loop 310 will start with i=M. The first (M-1) instructions of first set of instructions 301 are executed prior to the start of loop 310, the first (M-2) instructions of second set of instructions 302 are executed prior to the start of loop 310, and so on until only the final set of instructions starts within loop 310.

Correspondingly, first set of instructions 301 will be complete at the end of loop 310, second set of instructions 302 will have at least one instruction remaining, third set of instructions 302 will have at least two instructions remaining, and the final set of instructions will have at least M instructions remaining. These remaining instructions are completed after the completion of loop 310. Parallelization opportunities exist for combinations of these remaining instructions.

For example, after instruction 171a (A1 [1]) and instruction 171b (A2[1]), a parallel instruction 411 is a VLIW word of A1 [2] and B1[1], and a parallel instruction 412 is a VLIW word of A2[2] and B2[1]. This parallelization is possible because B1[1] depends on A1 [1], rather than A1[2], and B[1] depends on A2[1], rather than A2[2]. A parallel instruction 413 is a VLIW word of A1[3], B1[2] and C1[1]; and a parallel instruction 414 is a VLIW word of A2[3], B2[2] and C2[1].

Within loop 310, a parallel instruction 421 is a VLIW word of A1 [N], B1[N−1], C1[N−2] and D1[N−3]. A parallel instruction 422 is a VLIW word of A2[N], B2[N−1], C2[N−2] and D2[N−3].

Following loop 310, a parallel instruction 415 is a VLIW word of B1 [N], C1 [N−1] and D1[N−2]; and a parallel instruction 416 is a VLIW word of B2[N], C2[N−1] and D2[N−2]. A parallel instruction 417 is a VLIW word of C1 [N] and D1[N−1], and a parallel instruction 418 is a VLIW word of C2[N] and D2[N−1]. An instruction 419 (D1[N]) and an instruction 420 (D2[N]) complete the instructions that were not executed within loop 310.

Figure 5A:
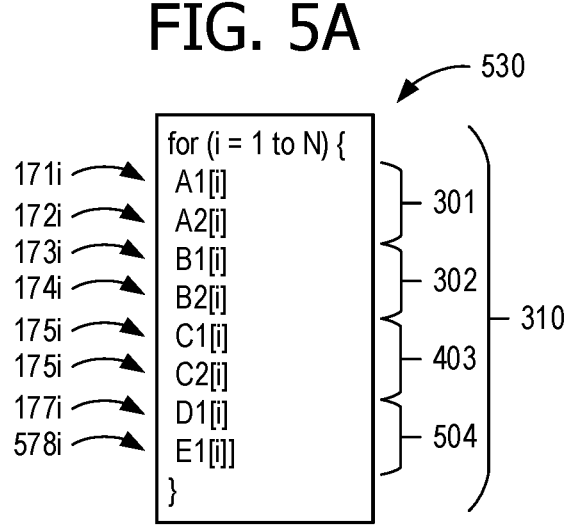
FIGS. 5A and 5B illustrate balancing sets of instructions for interleaving with various architectures, such as the example architecture of FIG. 1.
Figure 5B:
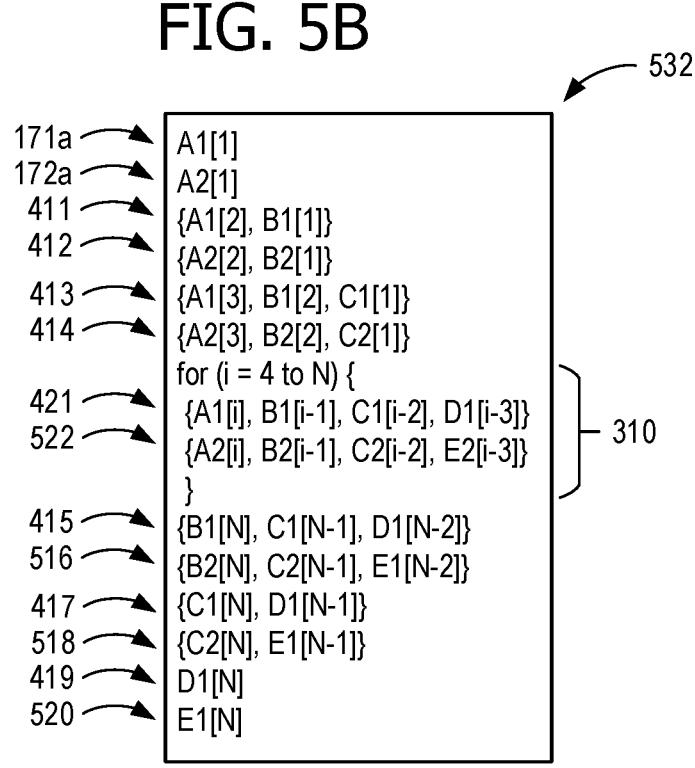

FIGS. 5A and 5B illustrate balancing sets of instructions for interleaving with architecture 100. In FIG. 5A, an intermediate stage program 530, which may be in machine language, is to be converted into compiled program 132. Intermediate stage program 530 is similar to intermediate stage program 430, except for the replacement of instruction 178i (D2[i]) with an instruction 578i (E1[i]).

In this example, instruction 578i is E1[i]=i+11. This might result in instruction 578i being identified as being within first set of instructions 301, along with A1[i] and A2[i], because of the lack of dependence on prior instructions within loop 310. However, this would result in first set of instructions 301 having three instructions, a fourth set of instructions 504 having only a single instruction, and the other sets of instructions having two each. This is imbalanced.

By placing instruction 578i into fourth set of instructions 504, along with instruction 177i (D1 [i]), the different sets of instructions are more balanced. Balancing in this manner works as long as the parallelization is not jeopardized, which does not occur with this example.

FIG. 5B illustrates an intermediate stage program 532 that is similar to intermediate stage program 432, with the exception of the substitution of instruction 578i for instruction 178i. Within loop 310, a parallel instruction 522 is a VLIW word of A2[N], B2[N−1], C2[N−2] and E1 [N−3]. Following loop 310, a parallel instruction 516 is a VLIW word of B2[N], C2[N−1] and E2[N−2], and a parallel instruction 518 is a VLIW word of C2[N] and E1 [N−1]. An instruction 520 (E1 [N]) completes the instructions that were not executed within loop 310.

Figure 6:
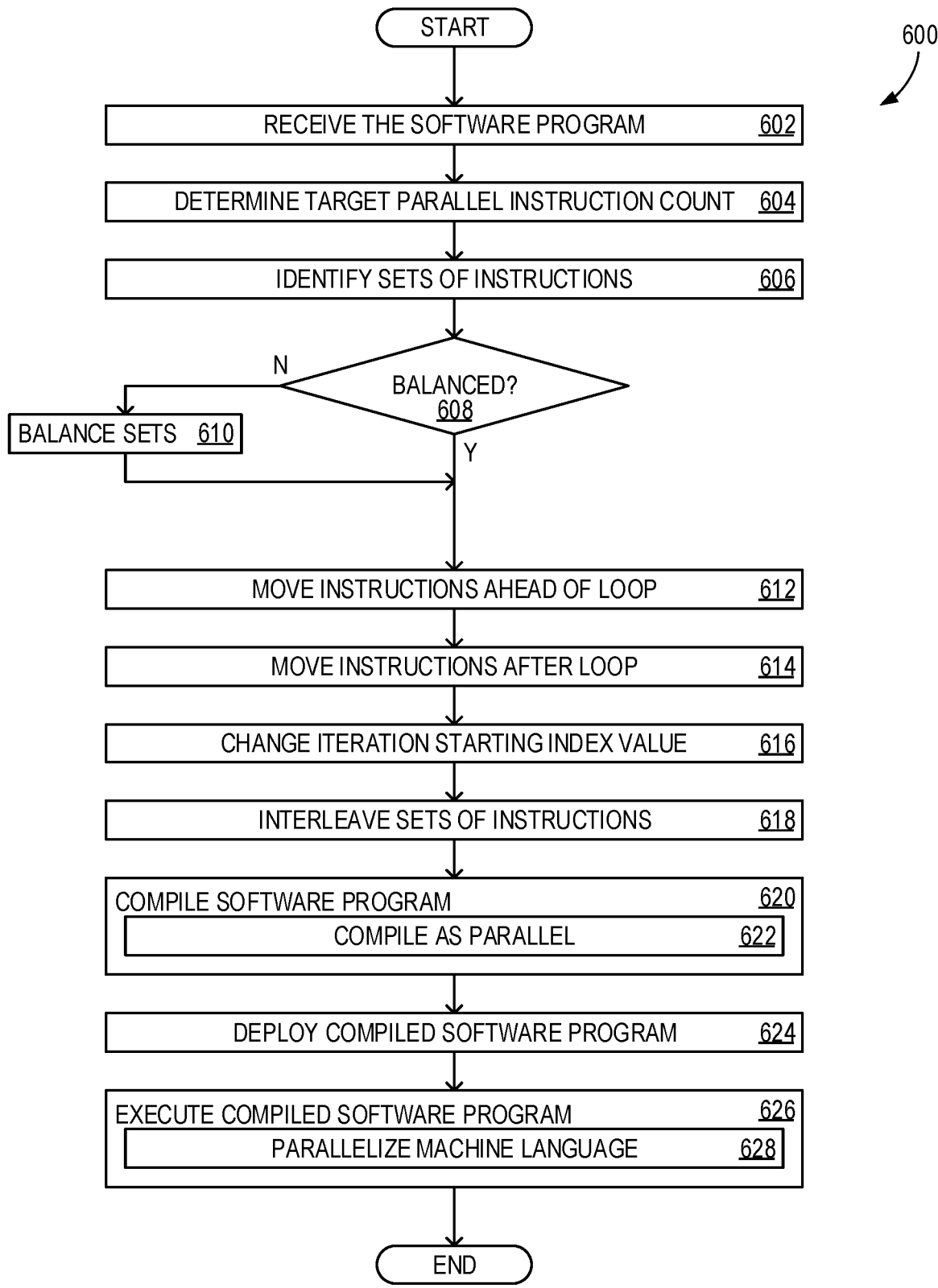
FIG. 6 shows a flowchart illustrating exemplary operations that may be performed using examples of various architectures, such as the example architecture of FIG. 1.

FIG. 6 shows a flowchart 600 illustrating exemplary operations that may be performed by architecture 100. In some examples, operations described for flowchart 600 are performed by computing device 800 of FIG. 8. Flowchart 600 commences with compiler 120 receiving program 130 having loop 310 in operation 602. Loop 310 has a first loop iteration (i=1), a final loop iteration (i=N), and a plurality of intermediate loop iterations (i=2 through N−1). Loop 310 has a first loop iteration, a final loop iteration, and a plurality of intermediate loop iterations.

Loop 310 contains first set of instructions 301 indexed on the loop iteration. In some examples, at least one instruction of first set of instructions 301 does not have dependency on any prior instruction within loop 310. In some examples, no instruction of first set of instructions 301 has dependency on any prior instruction within loop 310. Loop 310 further contains second set of instructions 302 indexed on the loop iteration. In some examples, at least a portion of second set of instructions 302 have dependency on first set of instructions 301 indexed on the same loop iteration.

Operation 604 determines the parallel instruction capacity of target processor 152. This is accomplished, in some examples, by compiler 120 determining a minimum number of registers available in target processor 152. In operation 606, compiler 120 identifies a plurality of sets of instructions including first set of instructions 301 and second set of instructions 302. In some examples, at least one instruction of first set of instructions 301 does not have dependency on any prior instruction within loop 310. In some examples, no instruction of first set of instructions 301 has dependency on any prior instruction within loop 310. In some examples, a count of the sets of instructions is at least equal to a minimum number of registers available in target processor 152. In some examples, a count of the sets of instructions is equal to the minimum number of registers available in target processor 152. In some examples, a count of the sets of instructions does not exceed the minimum number of registers available in target processor 152.

Decision operation 608 determines whether the count of the sets of instructions of the plurality of sets of instructions is balanced. If not, operation 610 improves the balance of the sets of instructions. This may be accomplished by moving an instruction from a set of instructions that has a surplus to a set of instructions that has a deficit, when doing so does not destroy parallelization (as shown in relation to FIGS. 5A and 5B).

In operation 612 compiler 120 moves instructions of first set of instructions 301, indexed on the first loop iteration, to ahead of loop 310 in execution order (i.e. to the prologue of loop 310). In operation 614 compiler 120 moves instructions of second set of instructions 302, indexed on the final loop iteration, to following loop 310 in execution order. Operation 616 changes the starting index value. The starting index is higher where more than two sets of instructions are identified, for example, index i is set to M where M is the number of parallel instructions to be used.

In operation 618, compiler 120 interleaves, within memory 170, remaining first set of instructions 312 with remaining second set of instructions 314. After interleaving within loop 310, an instruction of first set of instructions 301 indexed on the current loop iteration precedes an instruction of second set of instructions 302 indexed on the preceding loop iteration (e.g., indexed on i−1). The interleaving comprises interleaving the plurality of sets of instructions, such that, within loop 310, the interleaved instructions have sets of independent instructions having a length of at least the count of the sets of instructions.

In operation 620, compiler 120 compiles program 130 for target processor 152 into compiled program 132. Some examples include operation 622, in which compiler 120 places an instruction from first set of instructions 301 and an instruction from second set of instructions 302 into a VLIW instruction (e.g., places an instruction from each set of instructions of the plurality of sets of instructions into a single VLIW instruction). Compiled program 132 is deployed in operation 624.

In operation 626, target processor 152 executes compiled program 132 to generate output product 158. Some examples of operation 626 include operation 628, when target processor 152 is a parallelizing processor. In operation 628, target processor 152 parallelizes compiled program 132. In some examples, the parallelizing processor (i.e., target processor 152) comprises a superscalar processor.

Figure 7:
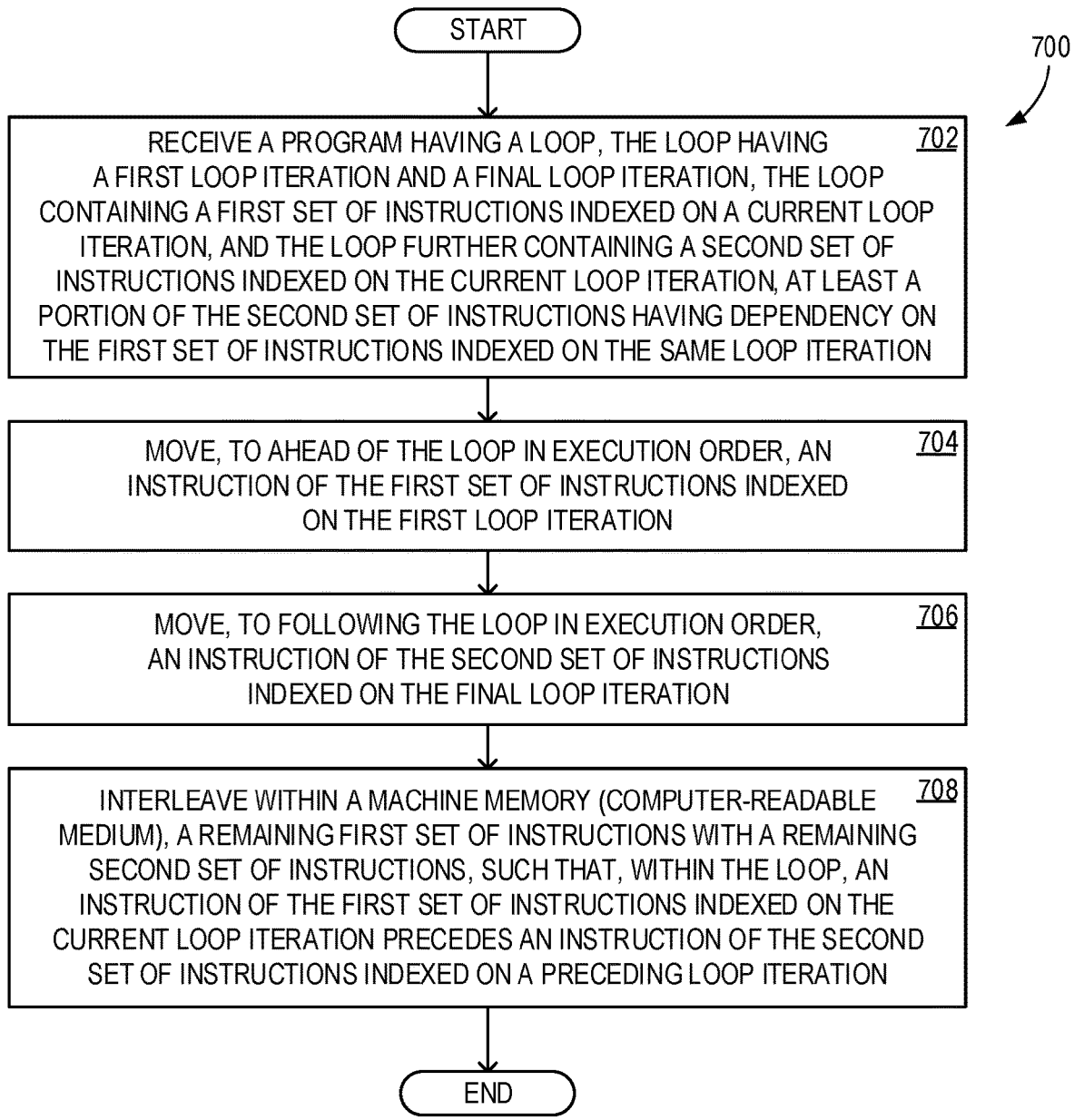
FIG. 7 shows another flowchart illustrating exemplary operations that may be performed using various examples, such as the example architecture of FIG. 1.

FIG. 7 shows a flowchart 700 illustrating exemplary operations that may be performed by architecture 100. In some examples, operations described for flowchart 700 are performed by computing device 800 of FIG. 8. Flowchart 700 commences with operation 702, which includes receiving a program having a loop, the loop having a first loop iteration and a final loop iteration, the loop containing a first set of instructions indexed on a current loop iteration and at least one instruction of the first set of instructions does not have dependency on any prior instruction within the loop, and the loop further containing a second set of instructions indexed on the current loop iteration, at least a portion of the second set of instructions having dependency on the first set of instructions indexed on the same loop iteration.

Operation 704 includes moving, to ahead of the loop in execution order, an instruction of the first set of instructions indexed on the first loop iteration. Operation 706 includes moving, to following the loop in execution order, an instruction of the second set of instructions indexed on the final loop iteration. Operation 708 includes interleaving, within a machine memory, a remaining first set of instructions with a remaining second set of instructions, such that, within the loop, an instruction of the first set of instructions indexed on the current loop iteration precedes an instruction of the second set of instructions indexed on a preceding loop iteration.

Additional Examples

An example system for interleaving machine instruction placement in memory comprises: a processor; and a computer-readable medium storing instructions that are operative upon execution by the processor to: receive a program having a loop, the loop having a first loop iteration and a final loop iteration, the loop containing a first set of instructions indexed on a current loop iteration, and the loop further containing a second set of instructions indexed on the current loop iteration, at least a portion of the second set of instructions having dependency on the first set of instructions indexed on the same loop iteration; move, to ahead of the loop in execution order, an instruction of the first set of instructions indexed on the first loop iteration; move to following the loop in execution order, an instruction of the second set of instructions indexed on the final loop iteration; and interleave within the computer-readable medium, remaining first set of instructions with remaining second set of instructions, such that, within the loop, an instruction of the first set of instructions indexed on the current loop iteration precedes an instruction of the second set of instructions indexed on a preceding loop iteration.

An exemplary method of interleaving machine instruction placement in memory comprises: receiving a program having a loop, wherein the loop has a first loop iteration and a final loop iteration, wherein the loop contains a first set of instructions indexed on a current loop iteration and at least one instruction of the first set of instructions does not have dependency on any prior instruction within the loop, and wherein the loop further contains a second set of instructions indexed on the current loop iteration, at least a portion of the second set of instructions having dependency on the first set of instructions indexed on the same loop iteration; moving to ahead of the loop in execution order, an instruction of the first set of instructions indexed on the first loop iteration; moving to following the loop in execution order, an instruction of the second set of instructions indexed on the final loop iteration; and interleaving, by the compiler, within a machine memory, remaining first set of instructions with remaining second set of instructions, such that, within the loop, an instruction of the first set of instructions indexed on the current loop iteration precedes an instruction of the second set of instructions indexed on a preceding loop iteration.

One or more example computer storage devices has computer-executable instructions stored thereon, which, on execution by a computer, cause the computer to perform operations comprising: receiving a program having a loop, wherein the loop has a first loop iteration and a final loop iteration, wherein the loop contains a first set of instructions indexed on a current loop iteration and no instruction of the first set of instructions has dependency on any prior instruction within the loop, and wherein the loop further contains a second set of instructions indexed on the current loop iteration, at least a portion of the second set of instructions having dependency on the first set of instructions indexed on the same loop iteration; moving to ahead of the loop in execution order, an instruction of the first set of instructions indexed on the first loop iteration; moving to following the loop in execution order, an instruction of the second set of instructions indexed on the final loop iteration; and interleaving, within a machine memory, remaining first set of instructions with remaining second set of instructions, such that, within the loop, an instruction of the first set of instructions indexed on the current loop iteration precedes an instruction of the second set of instructions indexed on a preceding loop iteration.

Alternatively, or in addition to the other examples described herein, examples include any combination of the following:
- compiling, by the compiler, the program for a target processor into a compiled program;
- compiling the program for the target processor comprises placing an instruction from the first set of instructions and an instruction from the second set of instructions into a single VLIW instruction;
- parallelizing, by a parallelizing processor, the compiled program;
- identifying, by the compiler, a plurality of sets of instructions including the first set of instructions and the second set of instructions;
- a count of the sets of instructions requiring a bank of registers of the size at least equal to a minimum number of registers available in the target processor;
- the interleaving comprises interleaving the plurality of sets of instructions, such that, within the loop, the interleaved instructions have sets of independent instructions having a length of at least the count of the sets of instructions;
- compiling the program for the target processor comprises placing an instruction from each set of instructions of the plurality of sets of instructions into a single VLIW instruction;
- improving a balance of the sets of instructions.
- determining, by the compiler, a minimum number of registers available in the target processor;
- identifying the first set of instructions and the second set of instructions;
- at least one instruction of the first set of instructions does not have dependency on any prior instruction within the loop;

no instruction of the first set of instructions has dependency on any prior instruction within the loop;
a count of the sets of instructions is equal to the minimum number of execution units available in the target processor;
a count of the sets of instructions consuming a register bank does not exceed the minimum number of registers available in the target processor;
the parallelizing processor comprises a superscalar processor; and
executing the compiled program to generate an output product.

While the aspects of the disclosure have been described in terms of various examples with their associated operations, a person skilled in the art would appreciate that a combination of operations from any number of different examples is also within scope of the aspects of the disclosure.

Example Operating Environment

Figure 8:
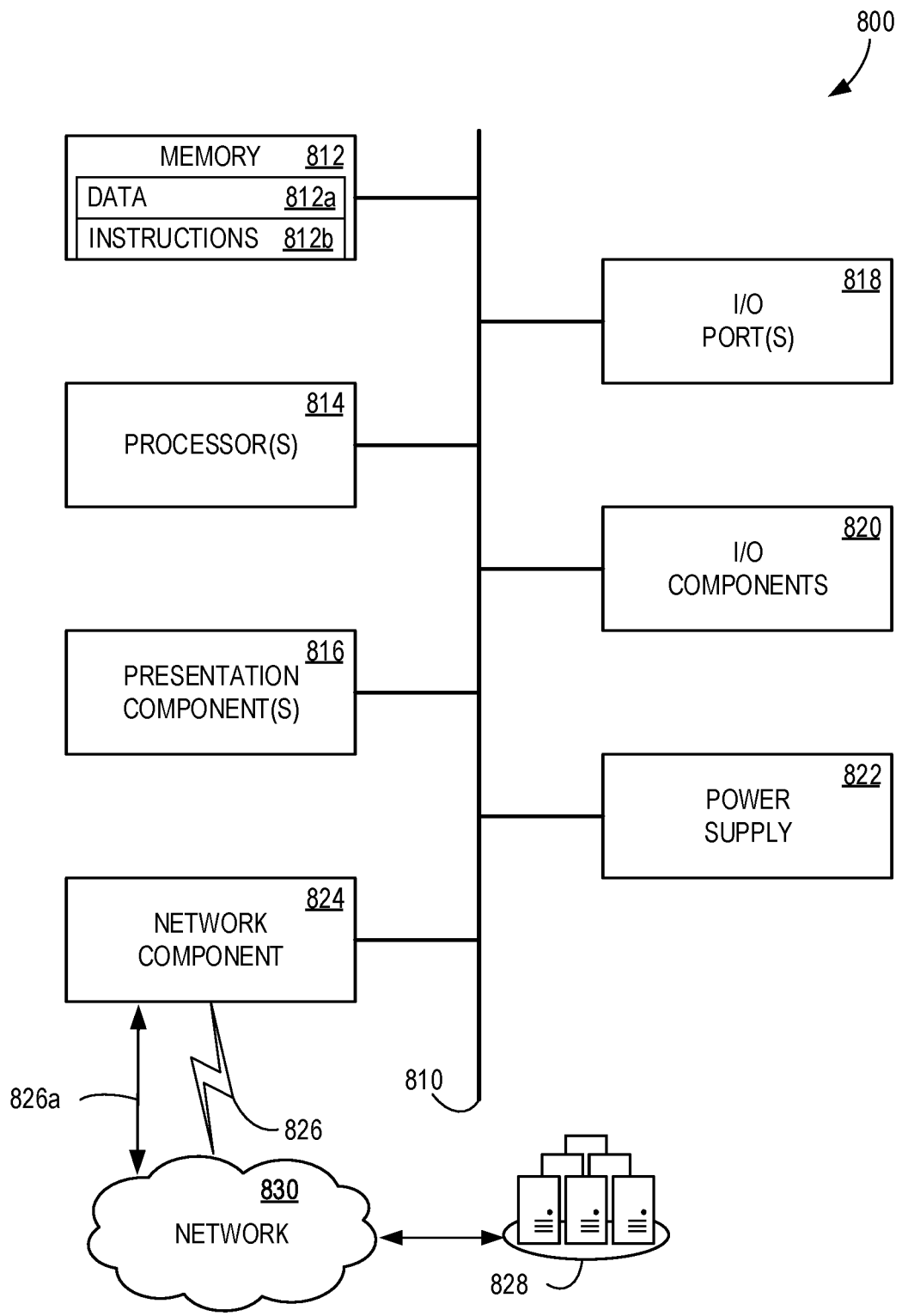
FIG. 8 shows a block diagram of an example computing device suitable for implementing some of the various examples disclosed herein.

FIG. 8 is a block diagram of an example computing device 800 (e.g., a computer storage device) for implementing aspects disclosed herein, and is designated generally as computing device 800. In some examples, one or more computing devices 800 are provided for an on-premises computing solution. In some examples, one or more computing devices 800 are provided as a cloud computing solution. In some examples, a combination of on-premises and cloud computing solutions are used. Computing device 800 is but one example of a suitable computing environment and is not intended to suggest any limitation as to the scope of use or functionality of the examples disclosed herein, whether used singly or as part of a larger set.

Neither should computing device 800 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 800 includes a bus 810 that directly or indirectly couples the following devices: computer storage memory 812, one or more processors 814, one or more presentation components 816, input/output (I/O) ports 818, I/O components 820, a power supply 822, and a network component 824. While computing device 800 is depicted as a seemingly single device, multiple computing devices 800 may work together and share the depicted device resources. For example, memory 812 may be distributed across multiple devices, and processor(s) 814 may be housed with different devices.

Bus 810 represents what may be one or more busses (such as an address bus, data bus, or a combination thereof). Although the various blocks of FIG. 8 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 8 and the references herein to a "computing device." Memory 812 may take the form of the computer storage media referenced below and operatively provide storage of computer-readable instructions, data structures, program modules and other data for the computing device 800. In some examples, memory 812 stores one or more of an operating system, a universal application platform, or other program modules and program data. Memory 812 is thus able to store and access data 812a and instructions 812b that are executable by processor 814 and configured to carry out the various operations disclosed herein.

In some examples, memory 812 includes computer storage media. Memory 812 may include any quantity of memory associated with or accessible by the computing device 800. Memory 812 may be internal to the computing device 800 (as shown in FIG. 8), external to the computing device 800 (not shown), or both (not shown). Additionally, or alternatively, the memory 812 may be distributed across multiple computing devices 800, for example, in a virtualized environment in which instruction processing is carried out on multiple computing devices 800. For the purposes of this disclosure, "computer storage media," "computer-storage memory," "memory," and "memory devices" are synonymous terms for the computer-storage memory 812, and none of these terms include carrier waves or propagating signaling.

Processor(s) 814 may include any quantity of processing units that read data from various entities, such as memory 812 or I/O components 820. Specifically, processor(s) 814 are programmed to execute computer-executable instructions for implementing aspects of the disclosure. The instructions may be performed by the processor, by multiple processors within the computing device 800, or by a processor external to the client computing device 800. In some examples, the processor(s) 814 are programmed to execute instructions such as those illustrated in the flow charts discussed below and depicted in the accompanying drawings. Moreover, in some examples, the processor(s) 814 represent an implementation of analog techniques to perform the operations described herein. For example, the operations may be performed by an analog client computing device 800 and/or a digital client computing device 800. Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways. I/O ports 818 allow computing device 800 to be logically coupled to other devices including I/O components 820, some of which may be built in. Example I/O components 820 include, for example but without limitation, a microphone, joystick, game pad, satellite dish, scanner, printer, wireless device, etc.

Computing device 800 may operate in a networked environment via the network component 824 using logical connections to one or more remote computers. In some examples, the network component 824 includes a network interface card and/or computer-executable instructions (e.g., a driver) for operating the network interface card. Communication between the computing device 800 and other devices may occur using any protocol or mechanism over any wired or wireless connection. In some examples, network component 824 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 824 communicates over wireless communication link 826 and/or a wired communication link 826a to a remote resource 828 (e.g., a cloud resource) across network 830. Various different examples of communication links 826 and 826a include a wireless connection, a wired connection, and/or a dedicated link, and in some examples, at least a portion is routed through the internet.

Although described in connection with an example computing device 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for interleaving machine instruction placement in memory, the system comprising:
    a processor; and
    a computer storage medium storing instructions that are operative upon execution by the processor to:
      receive a program having a loop,
        the loop having loop iterations including a first loop iteration and a final loop iteration,
        the loop containing a first set of instructions indexed on a current loop iteration of the loop iterations, and
        the loop further containing a second set of instructions indexed on the current loop iteration, a first instruction of the second set of instructions being dependent on a first instruction of the first set of instructions indexed on the same loop iteration;

move, to ahead of the loop in execution order, an instruction of the first set of instructions indexed on the first loop iteration;

move, to following the loop in execution order, an instruction of the second set of instructions indexed on the final loop iteration;

change the first instruction of the second set of instructions to be indexed on a preceding loop iteration; and interleave, within the computer storage medium, a remaining first set of instructions with a remaining second set of instructions, such that, within the loop, the first instruction of the first set of instructions indexed on the current loop iteration precedes the first instruction of the second set of instructions indexed on the preceding loop iteration.

2. The system of claim 1, wherein the instructions are further operative to:

compile, the program for a target processor into a compiled program.

3. The system of claim 2, wherein compiling the program for the target processor comprises placing an instruction from the first set of instructions and an instruction from the second set of instructions into a single very long instruction word (VLIW) instruction.

4. The system of claim 2, wherein the instructions are further operative to:

parallelize, by a parallelizing processor, the compiled program.

5. The system of claim 2, wherein the instructions are further operative to:

identify sets of instructions including the first set of instructions and the second set of instructions, wherein a count of the sets of instructions is at least equal to a minimum number of registers available in the target processor; and wherein the interleaving comprises interleaving the sets of instructions, such that, within the loop, interleaved instructions have sets of independent instructions having a length of at least the count of the sets of instructions.

6. The system of claim 1, wherein the instructions are further operative to:

determine a minimum number of registers available in a target processor.

7. A method of interleaving machine instruction placement in memory by a compiler, the method comprising:

receiving a program having a loop,
the loop having a first loop iteration and a final loop iteration,
the loop containing a first set of instructions indexed on a current loop iteration, and at least one instruction of the first set of instructions does not have dependency on any prior instruction within the loop, and
the loop further containing a second set of instructions indexed on the current loop iteration, a first instruction of the second set of instructions being dependent on a first instruction of the first set of instructions indexed on the same loop iteration;

moving, to ahead of the loop in execution order, an instruction of the first set of instructions indexed on the first loop iteration;

moving, to following the loop in execution order, an instruction of the second set of instructions indexed on the final loop iteration;

changing the first instruction of the second set of instructions to be indexed on a preceding loop iteration; and interleaving, within a machine memory, a remaining first set of instructions with a remaining second set of instructions, such that, within the loop, the first instruction of the first set of instructions indexed on the current loop iteration precedes the first instruction of the second set of instructions indexed on the preceding loop iteration.

8. The method of claim 7, further comprising:

compiling the program for a target processor into a compiled program.

9. The method of claim 8, wherein compiling the program for the target processor comprises placing an instruction from the first set of instructions and an instruction from the second set of instructions into a single very long instruction word (VLIW) instruction.

10. The method of claim 8, further comprising:

parallelizing, by a parallelizing processor, the compiled program.

11. The method of claim 8, further comprising:

identifying sets of instructions including the first set of instructions and the second set of instructions, wherein a count of the sets of instructions is at least equal to a minimum number of registers available in the target processor; and wherein the interleaving comprises interleaving the sets of instructions, such that, within the loop, interleaved instructions have sets of independent instructions having a length of at least the count of the sets of instructions.

12. The method of claim 7, further comprising:

improving a balance of the sets of instructions.

13. A computer storage device having computer-executable instructions stored thereon, which, on execution by a computer, cause the computer to perform operations comprising:

receiving, by a compiler, a program having a loop,
the loop having loop iterations including a first loop iteration and a final loop iteration,
the loop containing a first set of instructions indexed on a current loop iteration of the loop iterations, and no instruction of the first set of instructions has dependency on any prior instruction within the loop, and
the loop further containing a second set of instructions indexed on the current loop iteration, a first instruction of the second set of instructions being dependent on a first instruction of the first set of instructions indexed on the same loop iteration;

moving, to ahead of the loop in execution order, an instruction of the first set of instructions indexed on the first loop iteration;

moving, to following the loop in execution order, the second set of instructions indexed on the final loop iteration;

changing the first instruction of the second set of instructions to be indexed on a preceding loop iteration; and interleaving, by the compiler, within a machine memory, a remaining first set of instructions with a remaining second set of instructions, such that, within the loop, the first instruction of the first set of instructions indexed on the current loop iteration precedes the first instruction of the second set of instructions indexed on the preceding loop iteration.

14. The computer storage device of claim 13, wherein the operations further comprise:

compiling the program for a target processor into a compiled program.

15. The computer storage device of claim 14, wherein compiling the program for the target processor comprises placing an instruction from the first set of instructions and an instruction from the second set of instructions into a single very long instruction word (VLIW) instruction.

16. The computer storage device of claim 14, wherein the operations further comprise:
parallelizing, by a parallelizing processor, the compiled program.

17. The computer storage device of claim 14, wherein the operations further comprise:
identifying sets of instructions including the first set of instructions and the second set of instructions, wherein a count of the sets of instructions is at least equal to a minimum number of registers available in the target processor; and
wherein the interleaving comprises interleaving the sets of instructions, such that, within the loop, interleaved instructions have sets of independent instructions having a length of at least the count of the sets of instructions.

18. The computer storage device of claim 17, wherein the operations further comprise:
compiling the program for a target processor into a compiled program, wherein compiling the program for the target processor comprises placing an instruction from each set of instructions of the sets of instructions into a single very long instruction word (VLIW) instruction.

19. The system of claim 1, wherein changing the first instruction of the second set of instructions to be indexed on the preceding loop iteration comprises eliminating the dependency of the first instruction of the second set of instructions on the first instruction of the first set of instructions.

20. The system of claim 1, further comprising, based on changing the first instruction of the second set of instructions to be indexed on the preceding loop iteration, causing the first instruction of the second set of instructions and the first instruction of first set of instructions to be executed in parallel in the current loop iteration.

* * * * *